March 10, 1964 R. K. ULM 3,124,013
LIFTING JACK SUPPORTING BARS
Original Filed Dec. 1, 1961 3 Sheets-Sheet 1
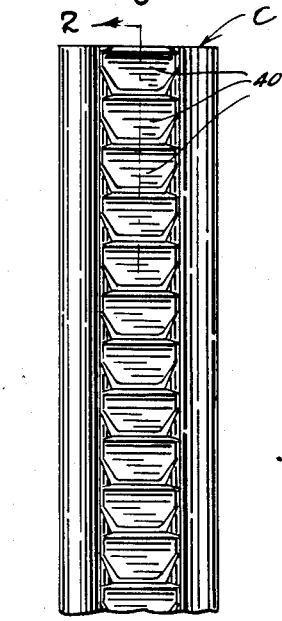
Fig. 1.
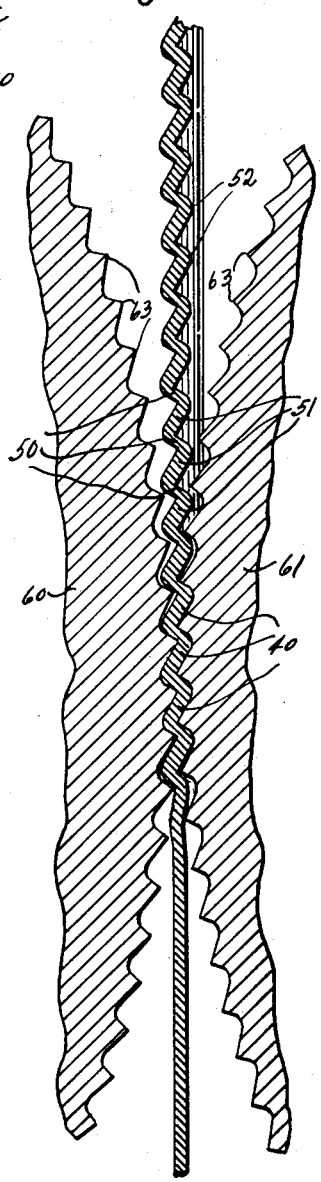
Fig. 3.
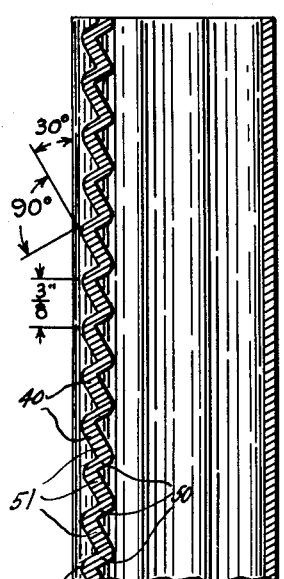
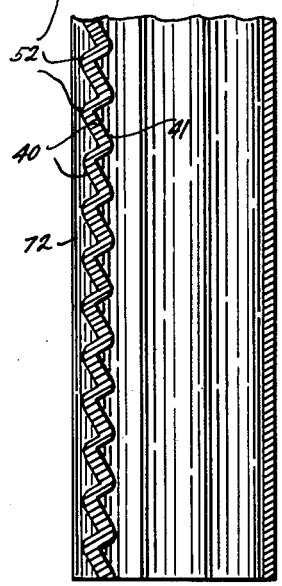
Fig. 2.
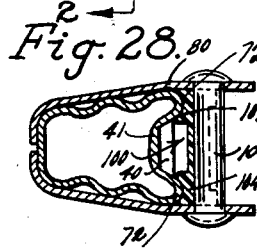
Fig. 28.
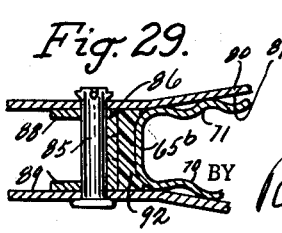
Fig. 29.
INVENTOR
RUSSELL K. ULM
BY
ATTORNEYS March 10, 1964 R. K. ULM 3,124,013
LIFTING JACK SUPPORTING BARS
Original Filed Dec. 1, 1961 3 Sheets-Sheet 2
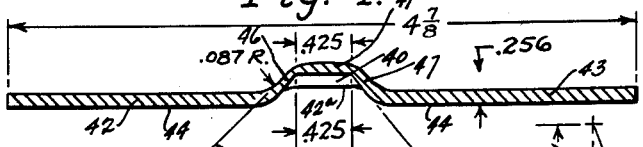
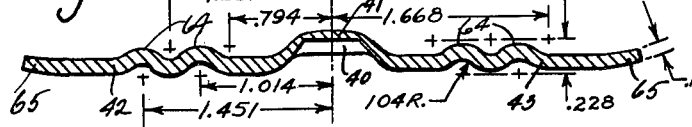
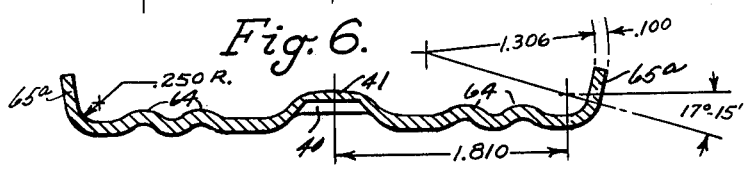
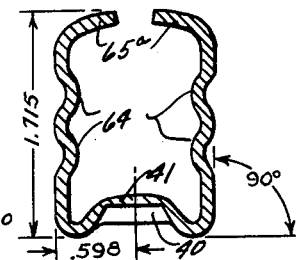
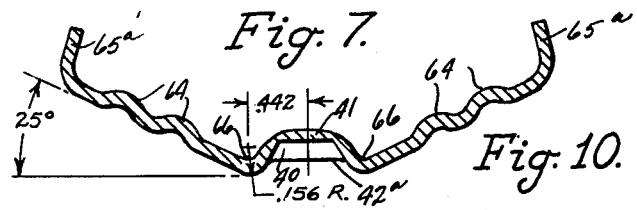
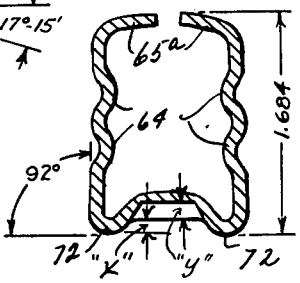
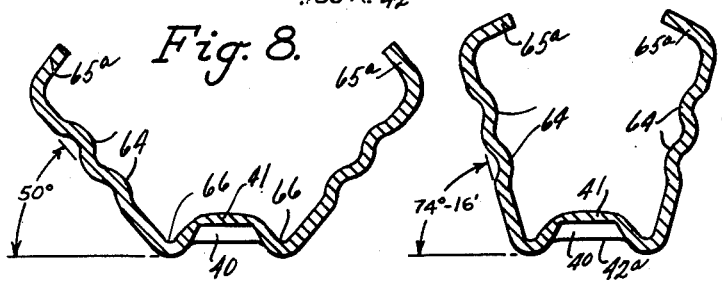
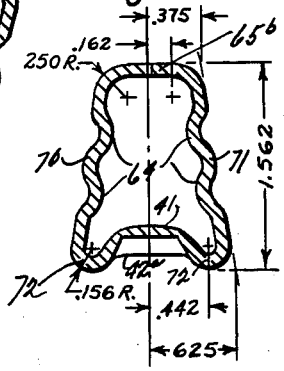
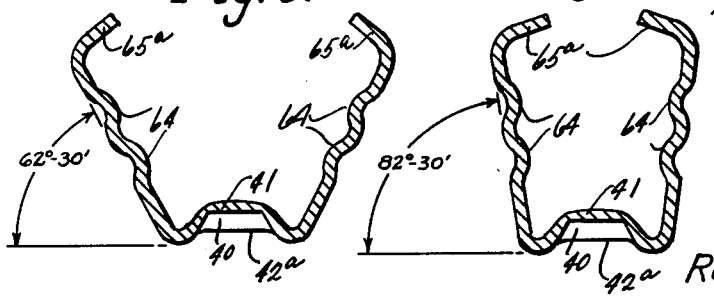
INVENTOR
RUSSELL K. ULM
BY
ATTORNEYS March 10, 1964 R. K. ULM 3,124,013
LIFTING JACK SUPPORTING BARS
Original Filed Dec. 1, 1961 3 Sheets-Sheet 3
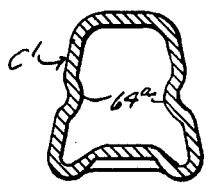
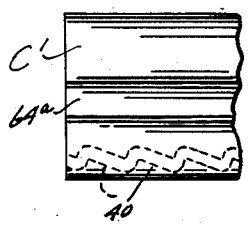
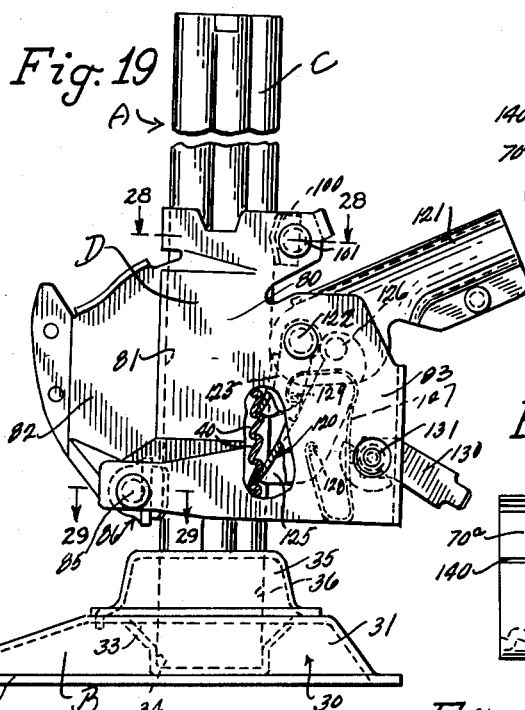
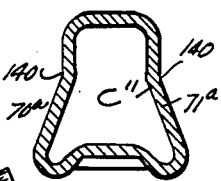
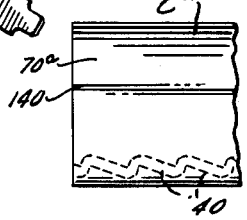
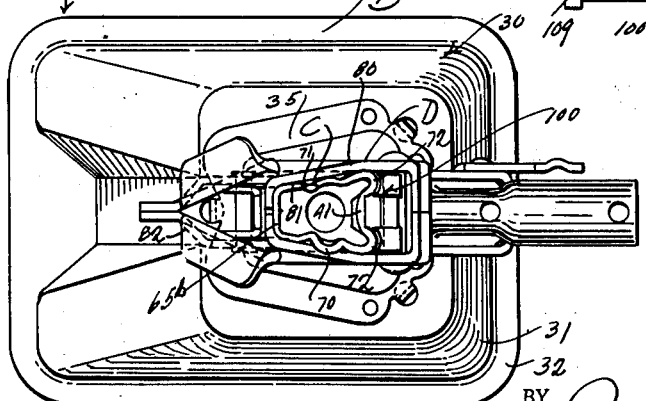
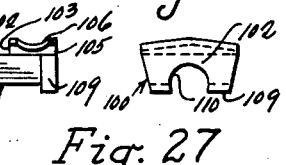
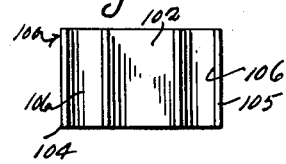
INVENTOR
RUSSELL K. ULM
BY
ATTORNEYS United States Patent Office 3,124,013
Patented Mar. 10, 1964

3,124,013
LIFTING JACK SUPPORTING BARS
Russell K. Ulm, Butler, Ind., assignor to Universal Tool & Stamping Company, Inc., Butler, Ind., a corporation of Indiana
Original application Dec. 1, 1961, Ser. No. 156,398. Divided and this application Sept. 17, 1962, Ser. No. 223,970
3 Claims. (Cl. 74—575)

This invention relates to improvements in lifting jacks and supporting bars and racks therefor.

The primary object of this invention is the provision of an improved supporting bar for automobile or vehicle lifting jacks which is very durably constructed for supporting large weights of vehicles against liability of bending or collapse, and which is provided with an improved arrangement of rack teeth best adapted to cooperate with the pawl mechanism of the lifting jack to insure quick and accurate movement of the lifting casing and housing.

This application is a division out of application Serial No. 156,398, filed December 1, 1961.

Other objects and advantages of this invention will be apparent during the course of the following detailed description.

In the accompanying drawings, forming a part of this specification and wherein similar reference characters designate corresponding parts throughout the several views:

FIGURE 1 is a fragmentary front elevation of the improved rack bar for lifting jacks.

FIGURE 2 is a fragmentary longitudinal cross sectional view taken substantially on the line 2—2 of FIGURE 1.

FIGURE 3 is a diagrammatic view showing how the teeth of the improved rack bar are formed in a wall of the tubular rack bar, and more particularly showing tooth-forming rolls and the manner in which they cooperate to form the improved tooth arrangement of the rack bar.

FIGURES 4 to 14 inclusive successively show the progressive steps in manipulating cold flat strip steel stock and shaping it into the improved tubular rack bar.

FIGURE 15 is a cross sectional view taken through a modified form of rack bar.

FIGURE 16 is a fragmentary side elevation of the bar of FIGURE 15.

FIGURE 17 is a cross sectional view taken through another form of rack bar.

FIGURE 18 is a side elevation of the form of rack bar shown in FIGURE 17.

FIGURE 19 is a fragmentary side elevation of the improved jack structure, partly in section, showing the pawl mechanism and improved anti-friction means for supporting the lift housing for easy movement along the rack bar.

FIGURE 20 is a plan view of the jack structure shown in FIGURE 19.

FIGURE 21 is a side elevation of an anti-friction slide member adapted to be supported by the lift housing or casing for engagement along the front wall of the rack bar to facilitate easy movement of the lift casing along the rack bar.

FIGURE 22 is a cross sectional view taken through the anti-friction member of FIGURE 21 substantially on the line 22—22 of FIGURE 23.

FIGURE 23 is a plan view of the anti-friction slide member of FIGURE 21.

FIGURE 24 is a rear elevation of an anti-friction slide member adapted to be supported by the lift housing of the jack for operation along the rear tooth wall of the jack bar structure.

FIGURE 25 is a plan view of the anti-friction member of FIGURE 24.

FIGURE 26 is an end view of the anti-friction member of FIGURE 25.

FIGURE 27 is a front elevation of the anti-friction member of FIGURE 24.

FIGURES 28 and 29 are fragmentary cross sectional views taken substantially on the lines 28—28 and 29—29 of FIGURE 19, and more particularly showing the rear and front anti-friction members of the lift housing adapted to engage the rack bar to facilitate easy movement of the pawl supported lift housing therealong.

In the drawings, wherein for the purpose of illustration is shown a preferred embodiment of the jack and modified forms of the rack bar, the letter A may generally designate the jack assemblage which includes a base B, improved rack bar C, and lifting assemblage D.

The base construction B is known in the art, and includes a stamped metal inverted cup-shaped main portion 30 having a body 31 and foot flanges 32 surrounding the same. A downwardly depending socket portion 33 is formed integral with the portion 31. It has a rack bar receiving socket 34 in the lower portion thereof. Spot welded to the upper wall of the portion 31 is a dome 35 provided with an opening 36 therethrough for receiving the lower end of rack bar C.

The rack bar C is formed in a continuous production tube mill out of cold flat strip or ribbon steel stock. The forming rolls operate to first produce the teeth in the stock plate, as shown in FIG. 3, and through successive passes the plate is formed by bending operations to produce a bar of tubular formation, polygonal or trapezoidal in cross section, as shown in FIG. 14.

In the sequence of passes the cold flat strip of steel stock enters the mill and a longitudinal series of teeth 40 are rolled centrally thereof; the rear wall 41 thus being depressed from the plane of the laterally extending flange portions 42 and 43. For standard sized jacks the dimensions of the teeth and the formation thereof are designated in FIG. 4 wherein it is shown that the rear edges 42ᵃ of each tooth lies appreciably inwardly of the rear surfaces 44 of the side flanges 42 and 43. The sides 46 and 47 are sloped relatively inward towards the rear wall 41 in convergent relation from their curved connections with the flanges 42 and 43. Some of the material from the ribbon of steel is used in forming the indented teeth and that is the reason the wall 41 and side convergent portions 46 and 47 are thinner than the flanges 42 and 43. Referring further to formation of the teeth as shown in FIG. 2 and FIG. 3. The lower pawl engaging portion 50 of each tooth slopes off horizontal downwardly to the rear, and joins with a lower tooth portion 51 which is longer than the portion 50 and which slopes downwardly and to the front; the lower end thereof being connected to the front end of the upper portion 50 of the next lowermost tooth 40. The front wall surface of the tooth portion 51 lies in a plane 30° off vertical and the planes of the outer surfaces of the upper portion 50 and the lower portion 51 of each tooth lie at 90° with respect to each other. The apex of the tooth designated at 52 is convexly curved and from such apex to apex, adjacent teeth extend approximately ⅜ of an inch. These dimensions may vary somewhat according to the size of rack bar needed. The juncture of the upper face of the tooth portion 50 and the rear face of the portion 51 forms a right angled chisel edge, since the pawls of the jack mechanism are intended to engage in the recess made by the tooth portions 50 and 51, at this juncture.

It will be noted from FIG. 3 how the bar teeth are rolled; the rolls 60 and 61 being shaped to provide the necessary above described tooth formation, and particularly the chisel edge 63 formed at the juncture of the outer surfaces of the tooth portions 50 and 51.

In the second pass of the rolling mill designated at FIG. 5, the steel ribbon flanges 42 and 43 are provided with longitudinally extending ribs 64, a pair being provided in each flange, although this may vary according to the size of the jack bar, and the ends 65 of these flanges 42 and 43 are upturned in the same direction as indentation of the teeth; the convexed sides of the rib 64 extending also in the same direction as indentation of teeth in the plate.

A third operation as shown in FIG. 6 further curls the portions 65 as indicated at 65ᵃ in FIG. 6.

In FIG. 7 the mill starts the closing operations of flanges 42 and 43 by bending the same at 66. In operations shown in FIGS. 8, 9, 10, 11, 12 and 13, side wall portions of the tube are formed by a sequence of passes through the angles designated in the drawings, and finally the ends of the portion 65ᵃ are brought into contact and pass through a welder of the mill where their marginal portions are heated and fused together to provide a front wall 65ᵇ designated in FIG. 14. In this view it is shown that in addition to the rear wall 41 there are now provided side walls 70 and 71. At each side of the tooth formation the rack bar is provided with convexly formed trackways 72 which project outwardly beyond the front edges 42ᵃ of the teeth. These trackways receive an anti-friction means to facilitate sliding of the jack lifting structure along the rack bar.

It will be noted that the distance "X" (FIG. 13) shows that the front edges 42ᵃ of teeth 40 are spaced from the rear edges of trackways 72, and the distance "Y" shows the actual depth of each tooth 40.

Referring now to the lifting assemblage D, the same includes a casing preferably shaped from a single piece of material to provide a central portion 80 having side walls to define a passageway 81 for receiving the bar C; an extension 82 which may appropriately be termed a lifting foot, at the front of the jack, and at the rear of the jack a housing portion 83 for receiving the pawl mechanism. At the lower front corner the casing of the assemblage D has side walls provided with a cross pin 85, shown in FIG. 19 and FIG. 29 adapted to support an anti-friction device 86, detailed in FIGS. 21, 22 and 23, and adapted to operate as an anti-friction piece against the front wall 65ᵇ of the jack bar C. This anti-friction member comprises a metal U-shaped clip 87 having leg portions 88 and 89 and a bight portion 90; the leg portions 88 and 89 being apertured at 90ᵃ to receive the pin 85 upon which the clip swivels. The bight portion 90 is centrally recessed and has a cross bar 91 adapted to support the solid synthetic resin anti-friction member 92. The anti-friction member 92 is provided with projecting portions 93 which fixedly engage in openings in the bight portion 90. Its outer surface is longitudinally grooved at 94 for receiving therein the wall 65ᵇ of rack bar C, as shown in FIG. 29. The outer sides of this anti-friction member 92 are ribbed to extend around the convexly curved edges of the rack bar where the wall 65ᵇ meets the walls 70 and 71.

The synthetic plastic material out of which the member 92 is made in a solid synthetic resin such as nylon or Du Pont "Delrin 500" which is an acetal resin known as a polyoxymethylene, the coefficient of hardness of which is adaptable for use as an anti-friction slide against metal. It is substantially of the material set forth in U.S. Patent 2,768,994, dated October 30, 1956.

At its upper rear corner the housing structure of the lifting assemblage D supports a synthetic resin anti-friction device 100 which is secured in place between the walls of the rack bar receiving portion 80 of the casing and mounted upon a pin 101 supported by said walls, as shown in FIG. 28. This anti-friction device is shown in detail in FIGS. 24, 25, 26, and 27, and comprises a body portion 102 provided on its front face with raised portions 104 and 105 with concavely curved faces 106 adapted to receive the trackways 72 of the jack bar. The recess 103 between the raised portions 104 and 105 faces the teeth of the rack bar in spaced relation therewith as shown in FIG. 28. The anti-friction member 100 has end rearwardly extending portions 109. These portions together with the body 102 are each provided with a channel 110 adapted to receive the pin 101 in snapped relation thereon, where it is retained thereon due to the fact that the channel 110 has its center spaced forwardly from the outer end edges of the portions 109. The synthetic resin piece 100 may be constructed of the same material as the synthetic resin member 92 above described.

The pawl mechanism 120 of the jack structure is conventional. It includes a pawl actuating member 121 which is a handle receiving socket, pivoted at 122. A short pawl 123 is pivoted at 122 upon the member 121. It is adapted to act upon the rack teeth 40 of the bar C. Upon the member 121 is also pivoted a longer pawl 125, at 126, also adapted to act against the rack teeth 40. A loop shaped spring 127 is provided in the housing structure for the assemblage D connected at one end at 128 to the lower end of the pawl 125 and connected at its other end at 129 to the lower end of the shorter pawl. The function of this spring is to urge the free ends of the pawls into association with respect to the rack teeth of the bar C. A trip lever 130 is pivoted at 131 on the housing of the jack for engagement with the bight portion of the spring 127. When in the position shown in FIG. 19 the spring induces a compressive force large enough to overcome both the tensile and compressive forces introduced in the spring by the alternate up and downward movement of the long pawl 125. When the trip lever 130 is lifted out of operation the up and downward movement of the handle of the jack and the member 121 will result in the jack descending upon the rack bar C. In operation the short pawl 123 will engage the teeth 40 in the edges 63 and the load will be transferred from the short pawl to the long pawl as the handle is depressed. The jack lifting assemblage moves upwardly when the handle is moved downwardly and when the handle is rotated upwardly the long pawl is pulled upwardly to the next tooth 40 upon the rack bar when the lever 130 is in the position shown in FIG. 19.

As shown in FIGURES 15 and 16, it is proposed to provide a rack bar C' for small sized jacks for use in connection with compact vehicles, which includes all the features above described for the bar C except that this bar C' is provided with a single reinforcing rib 64ᵃ on each side wall thereof.

As shown in FIGS. 17 and 18, a small sized jack bar C" may be provided in which the side walls 70ᵃ and 71ᵃ are angled at 140 instead of being ribbed.

In lieu of the synthetic resin anti-friction slide pieces 92 and 100 rollers may be used at these locations, if found desirable.

It will be noted that when the jack supports a load, the lower front anti-friction slide 86 is forced against the front wall of the bar and at the same time the upper anti-friction device 100 is similarly forced against the rear wall of the bar.

Various changes in the size, shape and arrangement of parts may be made to the form of invention herein shown and described without departing from the spirit of the invention or scope of the claims.

I claim:

1. As an article of manufacture a rigid rack bar of elongated tubular form polygonal in cross section comprising a rear rack wall, side walls connected therewith and a front wall connected with the side walls in spaced relation with respect to the rear wall, the rack rear wall having parallel rearwardly projecting side trackways adjacently connected to the side walls and an intermediate portion forwardly recessed between and connected with the trackways, and a series of teeth arranged lengthwise upon the intermediate portion set entirely inwardly and forwardly from the rear outer portions of said trackways.

2. A rigid steel rack bar formed of tubular material comprising a rear wall having side walls connected at the sides thereof and relatively converging away from the rear wall, and a front wall connected to the margins of the side walls, the side walls being longitudinally ribbed for reinforcement and the rear wall having a longitudinal channel defining at the sides thereof a pair of projecting exposed trackways and having a series of rack teeth entirely within the channel set forwardly from the outer portions of the trackways.

3. As an article of manufacture a rigid rack bar of elongated tubular form comprising a rear rack wall, side walls, and a front wall, the rear wall having formed in the rear surface thereof a longitudinal series of teeth in which each of the teeth comprises an upper pawl engaging flange portion with an upper surface which slopes rearwardly and downwardly and lies in a plane at 60° off vertical, each tooth also including a longer lower flange portion sloping downwardly from its connection with the rear end of the first-mentioned flange portion having a rear surface which slopes towards the front at an angle of 30° off vertical, the outer rear surfaces of the upper and lower flange portions each comprising a single plane which at their juncture are convexly curved for each tooth, the lower end of the rear surface of the lower flange portion of each tooth intersecting the rear upper flange rear surface of the next lowermost tooth in right angled relation to provide a chisel edge.

References Cited in the file of this patent

UNITED STATES PATENTS

| | | |
|---|---|---|
| 312,301 | Starr | Feb. 17, 1885 |
| 1,511,209 | Armstrong | Oct. 14, 1924 |
| 2,041,376 | Schmidt | May 19, 1936 |
| 2,531,251 | Bruno | Nov. 21, 1950 |
| 2,532,975 | Weber | Dec. 5, 1950 |